Feb. 26, 1952            B. D. BEDFORD            2,587,276
HIGH-SPEED BREAKER ARRANGEMENT FOR PROTECTION OF
VALVE CONVERTER CIRCUITS
Filed June 30, 1949
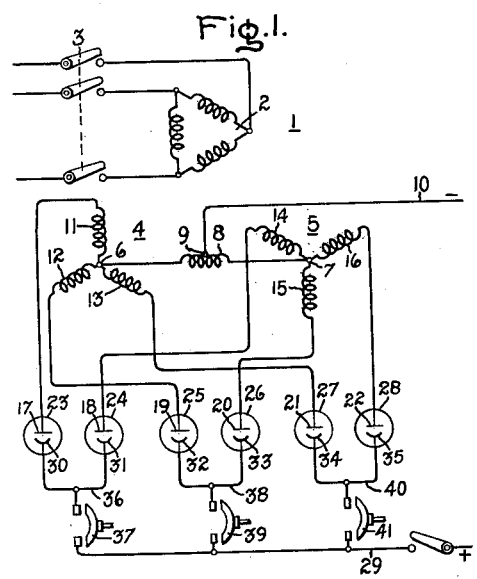
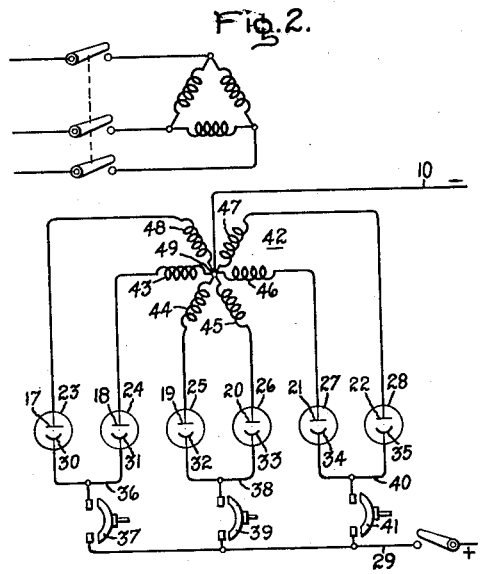
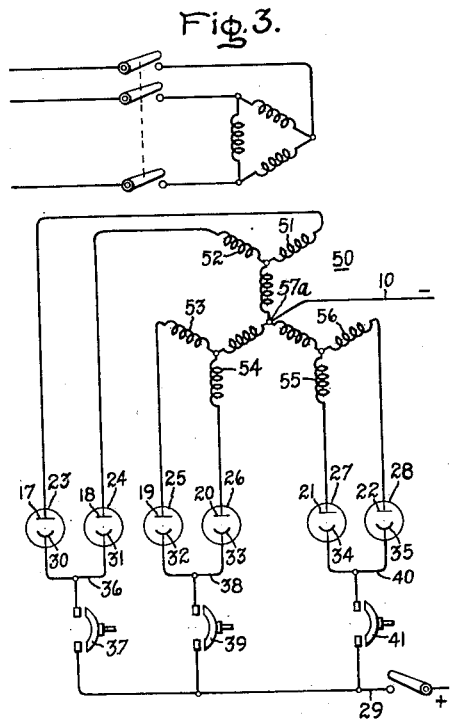
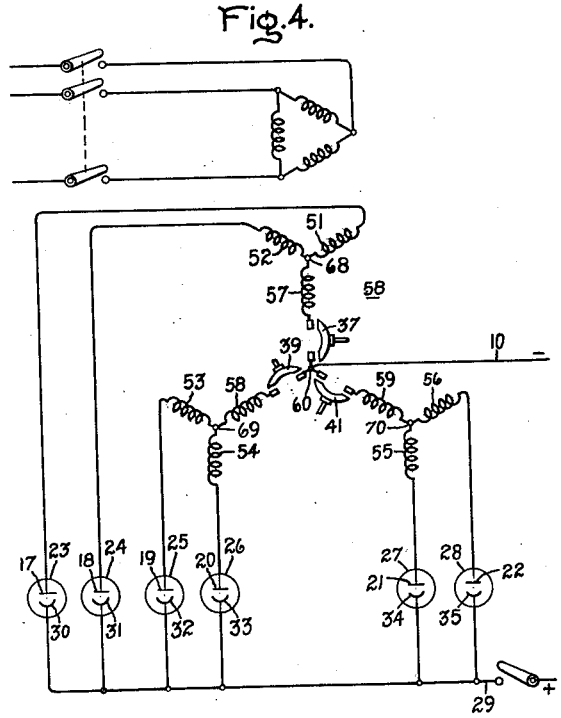
Inventor:
Burnice D. Bedford,
by *[signature]*
His Attorney.

Patented Feb. 26, 1952

2,587,276

UNITED STATES PATENT OFFICE 2,587,276

HIGH-SPEED BREAKER ARRANGEMENT FOR PROTECTION OF VALVE CONVERTER CIRCUITS

Burnice D. Bedford, Scotia, N. Y., assignor to General Electric Company, a corporation of New York Application June 30, 1949, Serial No. 102,256

1 Claim. (Cl. 321—12)

This invention relates to valve convertor circuits and more particularly to a valve convertor circuit employing high speed circuit breaker elements rapidly to interrupt the flow of current to an electrical fault in the valve convertor circuit or in an associated circuit supplied with electrical power therefrom. For convenience of description, my invention will be described herein with reference to rectifier circuits with the understanding that the principals involved are applicable to rectifier, inverter, or frequency changer circuits which I shall denominate by the term valve convertor circuits.

In an electrical rectifier circuit alternating current electrical power is supplied from an electrical source, normally through an electrical transformer to rectifier elements, such as rectifier tubes, which in turn supply a rectified current, normally called direct current, to direct current bus bars for distribution therefrom.

In such a circuit those skilled in the art will understand that it is highly desirable to interrupt as rapidly as possible the supply of electrical current to an electrical fault in the rectifier circuit or in an associated circuit supplied with electrical power therefrom. In one conventional arrangement to accomplish this result a single pole high speed circuit breaker is provided in the direct current circuit and the circuit breaker interrupts the supply of electrical power to a circuit supplied from the direct current bus bar. However, in a rectifier circuit having a plurality of rectifier elements the removal of a direct current bus bar from the rectifier circuit may not interrupt the supply of electrical current to an electrical fault in one of the rectifier elements because such current may be supplied to the rectifier element having the electrical fault from the remaining rectifier elements until another circuit breaker in another location, such as a circuit breaker in the alternating current circuit, interrupts the flow of current to the electrical fault. Thus, with this arrangement the interruption of current to the electrical fault in a rectifier element is accomplished only after the second circuit breaker operates and a rapid interruption of current to the electrical fault is not accomplished.

To provide a rapid interruption of the supply of electrical current to an electrical fault in a rectifier element of a rectifier circuit a second conventional arrangement may be employed wherein a plurality of high speed circuit breaker elements are provided one in series with each rectifier element. In this arrangement the supply of current to the electrical fault is rapidly interrupted and the remaining rectifier elements are prevented from continuing the supply of current to a rectifier element having the electrical fault.

However, such an arrangement requires one high speed circuit breaker element for each rectifier element, and, since each high speed circuit breaker element represents a considerable portion of the cost of the rectifier circuit, the arrangement entails a costly installation.

It is an object of this invention to provide an electrical arrangement in a valve convertor circuit rapidly to interrupt the flow of current to an electrical fault in a valve convertor element of the valve convertor circuit or to an electrical fault in an associated circuit supplied with electrical power therefrom.

It is a further object to provide an electrical arrangement reducing the number of high speed circuit breaker elements required to rapidly interrupt the flow of current to an electrical fault in a valve convertor element of a valve convertor circuit or to an electrical fault in an associated circuit supplied with electrical power therefrom.

In general, my invention consists of an electrical arrangement wherein the valve convertor elements are selectively grouped, the valve convertor elements of each group being close together in phase relation to provide a minimum voltage therebetween, and a high speed circuit breaker element is electrically connected in series with each group of valve convertor elements.

For a complete understanding of my invention, reference should be had to the following specification and the accompanying drawing wherein Fig. 1 is a diagrammatical view of a six phase Y connected rectifier circuit showing the application of my invention thereto, Fig. 2 is a diagrammatical view of a six phase star connected rectifier circuit showing the application of my invention thereto, Fig. 3 is a diagrammatical view of a six phase fork connected rectifier circuit illustrative of my invention, and Fig. 4 is a diagrammatical view of a modification of my invention as applied to a six phase fork connected circuit.

Referring to the drawing I have shown in Fig. 1 a transformer 1 having a delta connected primary winding 2 supplied with three phase electrical power through a disconnecting switch 3, and two Y connected secondary windings 4 and 5 whose common points 6 and 7 are interconnected by an interconnecting transformer 8.

Transformer 8 has a midtap 9 which is connected to a negative bus bar 10.

To rectify the alternating current supplied from secondary windings 4 and 5 the phase windings which I have numbered 11—16 are connected respectively to anodes 17—22 of respective rectifier tubes 23—28. To supply rectifier current from the rectifier tubes 23—28 to a direct current bus bar 29, a cathode bus bar (not shown) may be provided electrically to connect a plurality of cathodes 30—35 of the respective rectifier tubes 23—28 and a single pole circuit breaker (not shown) may be connected between the cathode bus and positive direct current bus bar 29. Such an arrangement is a conventional method for rectifying the alternating current of a transformer and supplying the rectified current to a direct current bus and in such an arrangement for a fault on a circuit supplied from the direct current bus bars 10 and 29 a single pole circuit breaker between a cathode bus and the direct current bus 29 is satisfactory to eliminate the supply of current to an electrical fault on the associated circuit. However, in the event that the electrical fault is caused by a failure of one of the rectifier tubes, for example tube 28, then the supply of current to the electrical fault may not be interrupted by a single pole breaker between a cathode bus bar and the direct current bus bar because the remaining rectifier tubes 23—27 may continue to supply electrical current to the electrical fault in rectifier tube 28. Therefore, it would be necessary for another circuit breaker of this system, as for example a circuit breaker in the alternating circuit, to operate to interrupt the supply of electrical current to the fault, and a rapid interruption of the supply of electrical current to the electrical fault it is not accomplished.

To provide a rapid interruption of the supply of current to an electrical fault in one of the rectifier tubes a second conventional arrangement may be employed wherein each of the cathodes 30—35 is connected to the positive direct current bus bar 29 through individual circuit breaker elements (not shown). In this arrangement each of the circuit breaker elements is arranged to trip on a small reverse current or on a larger current flowing through the tube to the positive bus 29. This arrangement provides for a rapid interruption of the supply of electrical current to an electrical fault in a circuit supplied through bus bar 29 and also provides rapid interruption of the supply of current to an electrical fault in one of the rectifier tubes. However, although this circuit provides the desired result as outlined above the arrangement requires in the case of a six phase circuit having six rectifier tubes, six circuit breaker elements, and since each of the high speed circuit breaker elements is a considerable portion of the cost of the rectifier circuit the cost of the total installation becomes considerable.

To reduce the number of high speed circuit breakers required to accomplish substantially the same result, in accordance with my invention, I selectively group the rectifier tubes 23—28 to form groups of rectifier tubes having electrically interconnected cathodes, the rectifiers in each group being close together in phase relation to provide a minimum voltage therebetween. For example, the anodes 17 and 18 of respective electronic tubes 23 and 24 are connected respectively to phase winding 11 and 14 which are only 60° apart in phase displacement. The cathodes 30 and 31 of electronic tubes 23 and 24 are electrically interconnected by conductor 36 which is electrically connected to the positive bus bar 29 through a high speed circuit breaker element 37. In a similar manner, cathodes 32 and 33 of respective rectifier tubes 25 and 26 are electrically interconnected by a conductor 38 to form a group and conductor 38 is electrically connected to bus bar 29 through a high speed circuit breaker element 39. Rectifier tubes 27 and 28 form a third group which is electrically connected to bus bar 29 through a conductor 40 electrically interconnecting the cathodes 33 and 34 and a high speed circuit breaker element 41 electrically connected between the conductor 40 and the bus bar 29.

Each of the high speed circuit breaker elements 37, 39 and 41 is provided with a high speed reverse current tripping mechanism to isolate the rectifiers of the particular group from the direct current bus bar in the event an arc back occurs in one of the rectifiers of that group. Thus in the case of an arc back in rectifier tube 28 current from the direct current bus 29 and the rectifier tubes 23—26 passes through the breaker element 41 to the electrical fault in tube 28 and from tube 27 through conductor 40 to tube 28. However, since breaker element 41 is equipped for reverse current tripping it then trips leaving only tube 27 connected to tube 28 to supply power to an electrical fault therein. This greatly reduces the supply of current to the electrical fault as such current is thereby limited to the amount of current a rectifier tube of 60° electrical displacement from tube 28 can supply. That is, by grouping the rectifier tubes the voltage which can be impressed on a tube having an electrical fault is reduced to approximately one-half the voltage which could be impressed on that tube were all of the cathodes connected by one cathode bus bar. For example, if all of the cathodes were interconnected by a common cathode bus bar and assuming an electrical fault in tube 28 then the difference of voltage of any of tubes 23—26 and tube 28 would be impressed on tube 28. Moreover, some of these voltages are about twice the difference in voltage of tubes 27 and 28 by reason of voltage in tubes 24—26 being 120° or more in phase displacement from the voltage in tube 28 as compared to a 60° displacement between the voltage of tubes 27 and 28.

Moreover, the fault current supplied to tube 28 by this reduced voltage is interrupted when the alternating voltage between the anodes 21 and 22 reverses, and rectifier tube 27 will seldom if ever reestablish the supply of current to the fault in response to the inverse voltage which follows as it is about one-half the normal inverse voltage for the reasons explained above. Therefore, breaker element 41 is effective in eliminating the supply of current to an electrical fault in tube 28. In a similar manner breaker elements 37 and 39 operate to interrupt the supply of current to an electrical fault occurring in tubes 23—26.

In the event of a complete failure of two rectifier elements connected to one circuit breaker element only a moderate alternating current flows to the faults because the circuit to the fault includes the impedance of the interphase transformer 8. The alternating current switch 3 or a fuse which must be supplied to protect the transformer operates in case the two rectifier tubes connected to a circuit breaker element continue to arc back.

Therefore, by selectively grouping the rectifier tubes as outlined above and providing an interphase transformer connecting the secondary winding I have provided an electrical arrangement requiring only three circuit breaker elements to accomplish substantially the same results in interrupting the supply of electrical current to an electrical fault on an associated circuit or in one of the rectifier tubes as is accomplished by six circuit breaker elements in a conventional arrangement.

In the case of a 12 phase Y connected secondary circuit the rectifier tubes may be grouped in groups of four instead of two with the result that only three circuit breaker elements are required, instead of twelve circuit breaker elements required by the conventional arrangement.

To give greater protection in the case of a 12 phase Y connected secondary the groups may be limited to two rectifiers in each group thus requiring 6 circuit breaker elements which is a substantial saving over the 12 circuit breaker elements required in the conventional arrangement. The protection of six circuit breaker elements in my arrangement is substantially as effective as the protection provided by 12 poles in the conventional arrangement and in a small rectifier the circuit breaker's cost is considerably reduced.

To show the application of my invention to a six phase star connected secondary winding, Fig. 2 has been provided. In Fig. 2 the star connected secondary winding 42 comprises phase windings 43—48 which are connected to respective rectifier tubes 23—28 and the rectifier tubes are selectably grouped and electrically connected to bus bar 29 in the same manner as described for the rectifier circuit of Fig. 1 thus giving a minimum voltage between the tubes of a particular group and the negative direct current bus bar 10 is connected to a common point 49 of the secondary winding 42. In operation the three circuit breaker elements 37, 39 and 41 operate to interrupt the supply of electrical current to a fault in a circuit supplied with electrical current from the direct current bus bars 10 and 29 and each of the circuit breaker elements operate individually in response to a reverse current to interrupt the flow of current to an electric fault caused by failure of one of the rectifier tubes in a particular group protected by that element. Thus, the operation is the same except for the effect of the interconnecting transformer 8 which effect is to decrease the supply of alternating current to an electrical fault caused by the failure of two rectifier tubes on one particular group.

To show the application of my invention to a six phase fork connected secondary winding Fig. 3 is provided. In Fig. 3 the secondary winding is numbered 50 and the six forked phase windings are numbered 51—56. Phase windings 51—56 are connected respectively to the anodes 17—22 of the respective rectifier tubes 23—28 and the tubes are selectively grouped and connected to the bus bar 29 in the same manner described with reference to Figs. 1 and 2. The negative bus bar 10 is connected to a common point 57a of the secondary winding 50. The operation of the circuit is the same as described for the arrangement of Fig. 2 and thus substantially the same protection is provided with three circuit breaker elements for the rectifier circuit shown in Fig. 3 as would be supplied by six breakers in a conventional arrangement.

To show a modification of the circuit breaker element arrangement of my invention, Fig. 4 is provided. In Fig. 4 I employ a six phase fork connected secondary winding 58 although the arrangement which I am about to describe may also be used in the star connected secondary winding 42 of Fig. 2.

In the arrangement shown in Fig. 4, the six forked phase windings 51—56 are respectively electrically connected to the anodes 17—22 of respective rectifier tubes 23—28 and the respective cathodes 30—35 are electrically connected to the direct current bus bar 29. The remaining phase windings of the secondary winding 58 have been given the numerical reference numbers 57—59.

To selectively group the rectifier tubes to provide a minimum voltage between the rectifier tubes in each group and to provide an arrangement for interrupting the supply of electrical current to each group, the high speed circuit breaker elements, 37, 39 and 41 are respectively electrically connected between respective phase windings 57—59 and a common point 60 of the secondary winding 58, as shown in Fig. 4. The negative bus bar 10 is electrically connected to the common point 60 of the secondary winding 58 to cooperate with the positive bus bar 29 in supplying direct current to an associated circuit.

As so connected for an electrical fault on an associated circuit supplied with electrical current from the direct current bus bars 10 and 29 all three of the high speed circuit breaker elements open to interrupt the supply of current to the electrical fault. For an electrical fault caused by failure of one of the rectifier tubes the breaker element associated with that tube opens in response to a small reverse current caused by the failure of that tube to disconnect that tube and the remaining tubes in the same group from the negative direct current bus bar 10. For example, if rectifier tube 28 fails, circuit breaker element 41 opens on a small reverse current caused by a failure of rectifier tube 28 and rectifier tubes 27 and 28 are disconnected from the negative bus bar 10. Thus the only rectifier which can continue to supply current to the electrical fault in rectifier tube 28 is tube 27. However, tubes 27 and 28 are only 60 electrical degrees apart in phase displacement. Therefore, the supply of electrical current to the electrical fault in tube 28 is greatly reduced. Moreover, this current is interrupted when the alternating voltage between the two anodes 21 and 22 reverses, and rectifier tube 27 which remains connected to the rectifier tube 28 seldom, if ever, passes current to tube 28 in response to the inverse voltage which follows because such inverse voltage is approximately one-half of the normal inverse voltage. Thus, the supply of current to an electrical fault in a rectifier tube of the rectifier circuit or to an electrical fault in an associated circuit supplied with the electrical current from the rectifier circuit is interrupted by employing only three circuit breaker elements instead of the six circuit breaker elements required in conventional arrangement to produce the same result.

Although in the foregoing, for the purpose of illustration, I have described my invention with respect to rectifier circuits, it will be obvious to those skilled in the art that my invention may also be used with electrical inverters and frequency changer circuits to reduce the number of high speed circuit breaker elements required to protect the circuit against electrical faults in the inverter or frequency changer circuits or in an associated circuit supplied with electrical current therefrom, and for this reason the term electric valve converting circuit indicates either a rectifier, inverter or frequency changer circuit.

I have therefore, provided an electrical arrangement or valve converter circuits to interrupt the supply of electrical current to an electrical fault in an associated circuit supplied therefrom and to interrupt the supply of electrical current to an electrical fault in the valve converter circuit caused by a failure of one of the valve converter elements.

Furthermore, by an arrangement, this result is accomplished with a substantial saving in the number of high speed circuit elements required as compared to a conventional arrangement and, therefore, the cost of the valve converter circuit and protective arrangement is substantially reduced.

While I have shown and described particular embodiment of my invention, it will be obvious to those skilled in the art that various changes and modifications may be made without departing from my invention in its broader aspects and I, therefore, aim in the appended claim to cover all such changes and modifications as fall within the true spirit and scope of my invention.

What I claim as new and desire to secure by Letters Patent of the United States is:

In combination, multiphase transformer means having a plurality of secondary windings arranged in a predetermined phase relationship, an electric converter element in series with each of said windings, circuit means interconnecting each of said converter elements with another of said elements to form a plurality of group circiuts, each group including a pair of said elements, the phase displacement between the elements of each group being no greater than the phase displacement between one element of each group and any of the other of said converter elements, an electric circuit normally connected with each of said circuit means, and separate interrupting means for disconnecting each of said circuits from its associated circuit means.

BURNICE D. BEDFORD.

REFERENCES CITED

The following references are of record in the file of this patent:

UNITED STATES PATENTS

| Number | Name | Date |
| --- | --- | --- |
| 1,752,970 | Walty | Apr. 1, 1930 |
| 2,128,162 | Morton et al. | Aug. 23, 1938 |
| 2,134,580 | Rose | Oct. 25, 1938 |
| 2,275,881 | Bany | Mar. 10, 1942 |
| 2,315,599 | Cox et al. | Apr. 6, 1943 |
| 2,515,989 | Cox et al. | July 18, 1950 |